July 23, 1929.  E. R. PENNEY ET AL  1,722,231
LOCKING DEVICE
Filed June 18, 1927
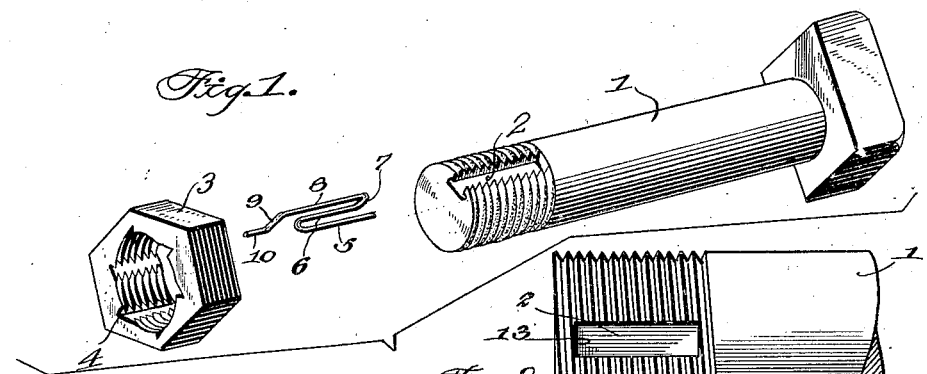
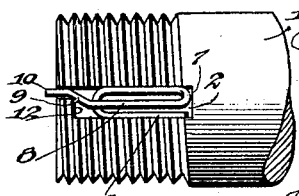
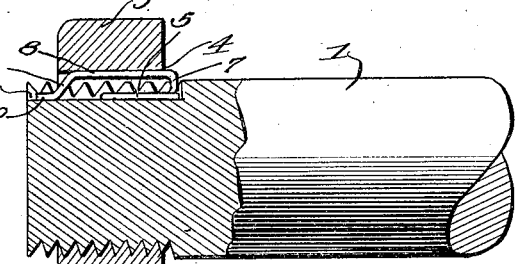
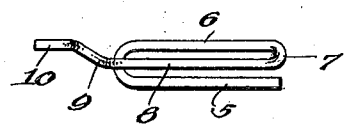
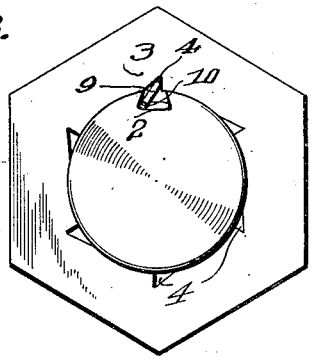
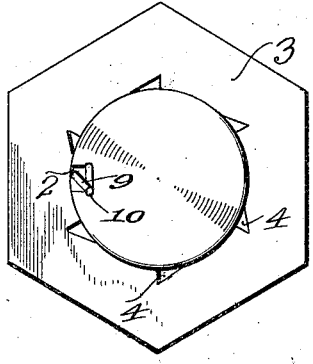
INVENTORS
J. W. Farrior,
E. R. Penney,
BY
ATTORNEY Patented July 23, 1929.

1,722,231

UNITED STATES PATENT OFFICE.

EARLY R. PENNEY AND JAMES W. FARRIOR, OF WARSAW, NORTH CAROLINA.

LOCKING DEVICE.

Application filed June 18, 1927. Serial No. 199,812.

This invention relates to means for locking nuts against "backing off" rotation from their bolts and aims to provide a novel structure applicable to interthreading devices of this character which shall have the advantage of simplicity of structure, as well, additionally, as the advantage of providing a construction permitting release, disengagement and replacement of the interlocked parts without injury thereto.

The primary purpose of the so-called "lock nuts" is to hold a nut which has been tightened on its bolt, against reverse loosening movement through vibration, or unauthorized or purposeless reverse rotation. In many uses of such nuts, it is often necessary that the nut be unlocked. When the lock nut is so constructed as to require a jamming or distortion of the threads to lock it, the nut and frequently the bolt are ruined by forced removal. The construction presented by our invention while providing for an effective lock against loosening movement of the nut, is so organized as to permit release of the locking means and removal of the nut without injury to the nut or bolt or other similarly coacting members.

A preferred embodiment of our invention is illustrated in the accompanying drawings forming part of this specification and in which:

Figure 1 is a perspective view of a nut, bolt and locking spring pawl constructed in accordance with the present invention and in separated relation.

Figure 2 is an enlarged longitudinal section through the end of such a nut and bolt with the parts in coacting relation.

Figure 3 is an end elevation of the nut and bolt with the spring pawl engaging one of the ratchet surfaces and locking the nut against loosening movement.

Figure 4 is a similar end elevation but with the spring pawl pressed from the ratchet as the ratchet carrying nut is rotated to tighten.

Figure 5 is a top plan view of the resilient pawl.

Figure 6 is an elevation of one end of the pawl.

Figures 7 and 8 are top plan views of the threaded ends of bolts showing modified forms of pawl-seating slots therein.

Referring to the drawings by numerals, 1 indicates a suitable bolt having a longitudinal slot 2 traversing its threads and extending preferably for the length of the threads. The slot is suitably shaped to form the seat for a spring bar pawl later to be described, and in order to retain the pawl, it may taper as shown in Figure 3 or be grooved at its base edges as shown in Figures 1 and 4.

The interthreading nut which engages the bolt is indicated at 3, this nut, in accordance with our invention having one or more ratchet slots 4 traversing its threaded internal surface. For fineness in locking adjustment, a plurality of these ratchet slots are preferably provided. As illustrated, the number of ratchet slots corresponds to the number of sides of the nut; the location of the slots being at the junction of these sides since there is more material present at these points of junction and the nut structure is thereby not materially weakened by the ratchet slots.

Cooperating with the slot seat of the bolt and the ratchet slots of the nut is a spring pawl member of novel construction best seen in Figures 1, 2 and 5. This pawl is formed preferably of spring wire bent to form spaced base arms 5 and 6 substantially in parallel to engage the opposite side walls at the base of the bolt slot 2, the arm 6 being turned inwardly and upwardly at 7 to provide an intermediate spring bar 8 upstanding from and parallel with its base and bent downwardly and laterally at its outer end as at 9 to bring its outer end 10 in the plane of its base and alined with and beyond arm 6 so as to rest on the bottom of the bolt slot 2. The bar portion 8 is positioned substantially in parallel with the base arms 5—6 and in a plane at such distance therefrom that it will normally seat in the ratchet slots of the nut as these pass over while the nut is being screwed on. As the nut is tightened, the inclined faces of the ratchet slots engage the pawl bar 8 and press it downwardly toward the base of slot 2, the bar in its yielding movement turning in an arc of which the base arm 6 represents the axis or center. The yielding swing of pawl bar 8 is in the direction of tightening rotation of the nut and thereby facilitates the "turning up" of the nut. Reverse rotation of the nut is opposed by the engagement of pawl bar 8 with the shoulder of a ratchet slot in the nut. This resistance to reverse rotation is ample to prevent accidental backing off through vibration, etc. The pawl member, however, while resilient is of such material as may be deformed by abnormal strain or pressure. It is therefore possible, with the device of this invention to back a nut off with force, the bends 7 and 9 of the pawl crushing down as the bar 8 is forced hard down by the nut. The material of the pawl yields before that of the nut and bolt so that these are not injured and may be used again. Furthermore, the construction is such as to permit removal of the pawl member or disengagement thereof by an appropriate tool.

Attention is called to the fact that, as is usual with ratchet surfaces of common design, the ratchet grooves 4 present stop shoulders and inclines leading upwardly to the tops of these shoulders. These inclines are in the direction to permit rotation of the nut in tightening or clockwise direction as viewed in Figures 3 and 4 so that the incline of the slots will depress the bar pawls 8 into the bolt slot as the nut is tightened. This position of the bar pawl between ratchet surfaces is seen in Figure 4. In Figure 3 the bar pawl extends fully up into the ratchet groove preventing loosening rotation of the nut.

The base arms 5 and 6 of the pawl member fit snugly in the bolt slot 21 which is suitably shaped to retain the pawl therein and which, in the form shown in Figure 3, is tapered or beveled to provide a base wider than its top so that these base arms are held down to the base of the slot by the inclined walls thereof. In Figs. 1 and 4 this same result is attained by having straight side walls undercut at their bases by grooves seating the base arms. Many variations in the form of the slot 2 are possible. As shown in Figures 1-4, it is of uniform cross section to the end of the bolt and the pawl is held in place in the slot by the tension of its base arms 5 and 6 against the sides of the slot at its base and also by tension against pawl bar 8 when engaged by the nut. Or, as shown in Figure 7, the slot may extend full width to a point near the bolt end and be reduced in width to permit only the end 10 of the pawl member to project therethrough and slightly beyond the end of the bolt, the end wall 12 formed by the reduction in width of the slot acting as an abutment engaged by the connecting end of the base arms 5—6 and preventing removal of the pawl while the nut is on the bolt. In the first form discussed with the uniform cross section to the end of the bolt, the pawl may be removed by suitable pliers. In a third form, shown in Figure 8, the slot 2 terminates before reaching the end of the bolt providing an end abutment wall 13 hiding the pawl and making it impossible to remove it while the nut is on the bolt.

In the use of the described locking device on nuts and bolts, the bolt is inserted through the parts to be secured together and a nut 3 is run upon the bolt shank until it approaches the parts to be secured. The pawl which can be inserted in the bolt slot before or after installation of the bolt in the parts to be locked together, is easily applied to its slot, the base arms 5 and 6 being pressed together, if necessary to give the necessary clearance and thereafter seating in the base of the slot at its opposite sides or being held thereto by pressure against the bar pawl when the slot is rectangular and without taper or retaining grooves.

While the more familiar and common use of a locking device as described is with nuts and bolts, it is obvious that it is applicable to other interthreading devices of a similar nature and the terms "nut" and "bolt" where used, are intended as descriptive and not as restrictive terms. It will be obvious that the pawl and its slot may be transferred to the nut and the ratchet to the bolt; that the form of pawl and of the ratchet and pawl slots may be correspondingly varied, both as to cross section and length, within the spirit of our invention and the scope of the appended claims.

Having now described and ascertained the nature of the invention, what is claimed is:

1. In a device of the character described, a nut formed with ratchet surfaces, a bolt having a longitudinal slot therein forming a recessed seat, and a pawl member having a base snugly seating on the bolt at the bottom of said slot and having an upstanding bar pawl integrally connected thereto by an upwardly inclined spring arm and extending longitudinally of said slot in parallel with said base to engage the ratchet surfaces of the nut as it is turned on the bolt; the free end of said bar being bent downwardly and provided with a terminal portion alined with its base.

2. In a device of the character described, a nut formed with a ratchet slot in its internal threaded portion, a bolt having a slot therein longitudinally of its threaded portion, and a pawl member seated in said bolt slot comprising spaced longitudinally extending bar portions seated on said bolt and engaging the sides of said slot at its base and provided with an integral upwardly inclined spring arm connecting with an elevated pawl bar parallel with said spaced bars and effective to seat in said ratchet slot.

3. In a device of the character described, a nut having a ratchet slot traversing its threads, a bolt having a longitudinal slot traversing its threads, and a pawl member of spring stock having spaced integrally connected parallel base arms seating in and engaging the sides of said bolt slot at its base and an integrally connected upstanding parallel bar pawl positioned between said spaced base arms with its free end inclined laterally downward to aline with one of said base arms.

4. In a device of the character described, a nut and bolt having interthreading engagement, one having a ratchet slot therein and the other having a longitudinal slot therein to receive a pawl member, the latter comprising spaced base arms and an upstanding pawl arm in parallel therewith having a resilient hinging connection with the base arms.

5. In a device of the character described, a nut formed with a ratchet slot in its internal threaded portion, a bolt having a slot therein longitudinally of its threaded shank, and a pawl member seated in said bolt slot comprising spaced longitudinally extending bar portions seated on said bolt and engaging the sides of said slot at its base under spring tension, and provided with an integral upwardly inclined spring arm connecting with an elevated pawl bar parallel with said spaced bars and effective to seat in said ratchet slot.

6. In a device of the character described, a nut having a ratchet slot traversing its threads, a bolt having a longitudinal slot traversing its threads and undercut at its base, and a pawl member of spring stock having spaced integrally connected parallel base arms seating in and engaging the sides of said bolt slot at its undercut base under spring tension, and an integrally connected upstanding parallel bar pawl positioned between said spaced base arms with its free end inclined laterally downward to aline with one of said base arms.

EARLY R. PENNEY.
JAMES W. FARRIOR.